United States Patent
Junius

[19]

[11] Patent Number: 5,921,487
[45] Date of Patent: Jul. 13, 1999

[54] DEVICE FOR WINDING ELECTRIC TAPE TO GIVE A COIL

[75] Inventor: Hans-Toni Junius, Iserlohn, Germany

[73] Assignee: C. D. Wälzholz Produktions--Gesellschaft mbH, Hagen, Germany

[21] Appl. No.: 08/983,381

[22] PCT Filed: Jul. 18, 1996

[86] PCT No.: PCT/EP96/03172

§ 371 Date: Jan. 16, 1998

§ 102(e) Date: Jan. 16, 1998

[87] PCT Pub. No.: WO97/04471

PCT Pub. Date: Feb. 6, 1997

[30] Foreign Application Priority Data

Jul. 18, 1995 [DE] Germany .............................. 195 26 111
Oct. 12, 1995 [DE] Germany .............................. 195 37 996

[51] Int. Cl.$^6$ .................................................. B65H 18/28
[52] U.S. Cl. .......................................... 242/160.4; 242/176
[58] Field of Search .............................. 242/160.3, 160.4, 242/174, 176, 178, 410, 412, 414, 414.1, 535, 535.3, 548.1, 477.3, 484

[56] References Cited

U.S. PATENT DOCUMENTS

| H502 | 8/1988 | Mabee, III et al. ..................... 242/176 |
|---|---|---|
| Re. 33,240 | 6/1990 | Lothamer ................................. 242/176 |
| 3,023,888 | 3/1962 | Scott ..................................... 242/160.4 |
| 3,161,372 | 12/1964 | Kaufmann .............................. 242/176 |
| 4,568,033 | 2/1986 | O'Connor ............................... 242/176 |
| 4,645,135 | 2/1987 | Morris et al. . | |

FOREIGN PATENT DOCUMENTS

| 23291 | 7/1981 | European Pat. Off. . |
|---|---|---|
| 1181816 | 11/1964 | Germany . |
| 933803 | 8/1963 | United Kingdom . |
| WOA84/02328 | 6/1984 | WIPO . |

OTHER PUBLICATIONS

Patent Abstracts of Japan vol. 007, No. 250 (M–254), Nov. 8, 1983 & JPA 58 135067 (Matsushita Denki Sangyo KK), Aug. 11, 1983.

Patent Abstracts of Japan vol. 006, No. 226 (E–141), Nov. 11, 1982 & JPA 57 128013 (Tokyo Denko Kagaku Kogyo KK) Aug. 9, 1982.

*Primary Examiner*—John P. Darling
*Attorney, Agent, or Firm*—Collard & Roe, P.C.

[57] ABSTRACT

A device for winding a steel strip for coiling an electric strip free of distortion onto a coil. The device comprises a computer-controlled winding device having a rotatingly driven winding core, and a strip feeding device having a strip guide head arranged spaced from the winding core and being displaceable parallel with an axis of the winding core. The strip guide head and winding core are thus relatively displaceable against each other horizontally parallel with the axis of the winding core. The winding device is programmed to coordinate the rotary speed of the winding core and the axial relative speed between the winding core and the strip feed to wind the electric strip in an oscillating motion with successively wound layers. The device reverses the direction of the axial relative movement between the winding core and the strip feed when ends of the coil are reached. In addition, the device is programmed to accelerate the relative speed between the winding core and the strip feed during a winding rotation immediately prior to reversing direction.

4 Claims, 3 Drawing Sheets

DEVICE FOR WINDING ELECTRIC TAPE TO GIVE A COIL

The invention relates to a method of winding electric strip without distortion.

Electric strip materials are used, for example for punching from such materials the individual metal sheets of the core packets of power generators, transformers, electromagnets and electric motors. The electric strips consist of a special steel with exactly defined mechanical and electromagnetic properties and, according to Euro-standard 10 106 have to be delivered in a finally annealed condition.

An important electromagnetic property, which has to be assured across the entire length and width of the electric strip, is a low and defined cyclic magnetization loss. In addition, magnetic polarization as well as the mechanical properties are important parameters in terms of materials engineering.

If the cyclic magnetization loss is excessively high, this may lead to undesirable dissipation, for example in the form of heating of the core packets produced from such electric sheet metal. Such heating is substantially based on eddy currents, which are generated with cyclic magnetization in the alternating magnetic field in the core packet. Such eddy current losses are the lowest if the material employed for the electric strip has a defined crystallographic orientation, namely the so-called cube texture. If this cube texture, which is produced in the course of manufacture of the electric strip material, is disturbed, the material loses the required electromagnetic properties at least in the disturbed area.

Even the slightest deformations cause changes in texture in the material and thereby an increase in the displacement density, which is reflected by significantly poorer values of cyclic magnetization. For avoiding such damaging deformations, tensile and bending stresses near the yield point have to be avoided throughout the entire treatment process. For example, the tensile force in the cutting plant has to be kept to a minimum. Likewise, in all direction changes, the bending radius must not be below a critical bending radius leading to permanent bending deformations.

So that the texture of the material produced in the course of manufacture of the electric strip is impaired as little as possible also subsequently when the strip is transported and processed further, it is customary with manufacturers of electric strip material to treat the latter after the heat treatment with as much care as possible and to particularly avoid subjecting the material to high tensile and bending stresses. According to the state of the art, electric strip material is therefore wound into so-called disk coils as carefully as possible and with low strip tension, with the axial width of such disk coils corresponding with the width of the electric strip. Such disk coils are wound in most cases without a winding core; if need be, they may be wound on a winding core having a width conforming to the width of the electric strip.

Said narrow disk-like coils are relatively unstable on account of their special geometric shape especially if a very long section of strip is wound into a coil having a large diameter. This consequently poses the risk that the disk-like coil may be damaged during shipping or further processing, rendering it unusable. By increasing the strip tension during winding a permanent tensile stress is obtained in the electric strip wound into a coil. Such permanent tensile stress enhances the cohesion between the successively wound layers of the coil, which in turn stabilizes the coil. However, such increase in tensile stress is subject to narrow limits because of the risk of changes occurring in the texture of the material. Therefore, relatively short strip sections have to be accepted on each disk in practical life, whether liked or not.

In the course of further processing, the electric strip material is unreeled from said disk-like coil by means of special unwinding equipment and admitted to a punching machine. Due to the limited length of the electric strip section contained in one disk-like coil, such disk-like coils have to be changed relatively often, which is connected in each case with considerable expenditure in terms of time and labor. This, in turn, translates into a loss of productivity.

According to the state of the art (cf. WO 84/02328) it is known to wind strip with an oscillating motion in successive layers into a large coil whose winding core is several times wider than the strip. This known method is carried out with a laying computer, which is expected to make it possible to wind the steel strip under controllable and reproducible conditions with an oscillating motion in successive, closely wound layers into an exactly cylindrical large coil, whereby special measures are employed for distributing the points of reversal of the winding sense at the face sides of the coil uniformly over the circumference, in order to avoid deviations from the cylindrical shape caused by such changes.

Even if all bending radii and tensile stresses occurring in the course of winding in the process as defined by WO 84/02328 are adjusted in such a way that permanent deformations in the wound strip are excluded, said method is not still not suitable for coiling sensitive electric strip material into a large coil because crowding and deformation impairing the texture of the electric strip material in a lasting way occurs within the zone of the ends of the coil, namely where the direction of the winding sense has to be reversed within the range of the last pass of each winding layer.

Furthermore, a winding method for steel strip is known from EP 0 023 391 A1, in connection with which the axial spacing of the windings is to be larger within the zone of the ends of the coil than in its other longitudinal expanse. However, only a shock-absorbing effect is to be obtained in this way in that the outer windings, which are wound with a spacing from each other, are axially pushed together if, for example, the coil falls on its end. It is quite obvious from this objective alone that this afore-described coil, which has no end flanges, is unsuitable for receiving electric strip material that is highly sensitive with respect to deformation, because the unavoidable plastic deformations occurring in the presence of any stress caused by shocks would directly lead to changes in the texture of the material and thereby render the latter unusable. Furthermore, the radial shoulders unavoidably occurring in this process in the strip material at the ends of the coil make the winding of electric strip, which has to be coiled layer on layer in parallel, impossible due to the crowding occurring in this process.

U.S. Pat. No. 4,645,135, which was also published earlier, only discloses a method for winding soft elastomer tape. As opposed to electric strip, which is particularly sensitive to mechanical stress and deformation, elastomer tape, for example made of polyurethane, is to be coiled in an expanded and constantly prestressed state, whereby it is necessary to particularly assure that such prestress is not reduced at the ends of the coil, so that the tape is not relieved with formation of knots. Therefore, this method is absolutely unsuitable for coiling electric strip as well, as the latter always needs to be maintained below the point of critical deformation under strain, i.e., it must not be expanded like elastomer tape.

Therefore, the purpose of the invention is to solve this problem in order to make available the longest possible strip sections on a coil of electric strip without impairing the electromagnetic properties.

In order to solve this problem, the invention proposes the application of a method of winding steel strip for coiling electric strip into a large coil, in which the electric strip fed by a strip feeding device is wound on a rotatingly driven winding core having many times the width of the electric strip, whereby the strip feeding device, on the one hand, and the winding core, on the other hand, are relatively displaceable against each other parallel with the axis of the winding core, and the rotary speed of the winding core and the axial relative speed between the winding core and the strip feed are coordinated with each other under computer control in such a way that the electric strip is wound with an oscillating motion in successive, tightly wound layers, and whereby the direction of the axial relative movement between the winding core and the strip feed is reversed at the axial ends of the large coil under computer control as well. Furthermore, the invention relates to a device for carrying out the method, and to a large coil used as defined by the invention, whereby the axial relative speed between the winding core and the strip feed is accelerated for a short time at least during the last rotation of the winding core before the change in direction is initiated at the axial ends of the large coil.

Surprisingly, it was found that crowding and deformation as mentioned above can be avoided if at least the last two adjacent passes of each winding layer are pulled apart axially. In this way, adequate space is obtained laterally during the last rotation of such winding layer before the change in direction is initiated, and the required elastic saber-shaped deformation of the strip extending in the circumferential direction can take place in said space. In addition, such elastic saber-like deformation can be distributed over relatively large circumferential area, so that no sharp bends or crowdings ensue.

Furthermore, the object of the invention is a device for carrying out the above method, with a computer-controlled winding device having a rotatably driven winding core, and a strip feeding device with a strip guide head arranged with a spacing from the winding core, whereby the winding core and the strip guide head are relatively displaceable against each other horizontally parallel with the axis of the winding core, said device being characterized in that the strip guide head of the strip feeding device is displaceable parallel with the axis of the winding core. Owing to the fact that only the strip guide head but not the winding core with the heavy large coil has to be moved in connection with the present device, it is possible in a significantly superior way to make acceleration prior to the change in direction possible with simple driving means, and, furthermore, to keep the change in direction free of large forces of mass.

Alternatively, it is possible also that both the winding core and the strip guide head of the strip feeding device are displaceable horizontally parallel with the axis of the winding core, which permits superimposing of the axial motions of the winding core and the strip guide head. For example, the slow, uniform movements can be executed by the winding core with the heavy large coil, whereas the fast linear accelerations prior to and during the change in direction are executed with the lightweight strip guide head.

Furthermore, provision is made that the strip guide head of the strip feeding device is arranged with vertical displaceability. This makes it possible for the strip guide head to follow the increasing diameter of the coil in such a way that the spacing between the strip guide head and the point of run-up of the strip on the coil remains always the same. Such constant spacing significantly facilitates exact and exactly reproducible guidance of the strip by the laying computer.

Finally, provision is made that the winding core is pivotably mounted, swinging around a vertically extending axle. In this way, the winding core always can be aligned in such a way that the electric strip is always running up in the same direction as the direction in which the respective winding layer is aligned. The strip is subjected in this way to even less deformation in the course of the winding process. However, the swinging movements of the winding core would have to be precisely coordinated in this case with the other movements of the parts of the device.

The object of the invention is, furthermore, a large coil of the wound electric strip, which is characterized in that the electric strip is wound free of distortion on a winding core in layers tightly wound with an oscillating motion, such winding core being many times wider than the electric strip, whereby the axial spacing of the strip is enlarged at least between the two last adjacent passes of the wound layer in the end zone of the large coil at least within within the circumferential range of the change of direction of the winding sense of the last wound pass versus the spacing of the strip between adjacent passes in the longitudinal expanse of the large coil. The range of enlargement of the spacing usefully extends in this connection approximately across the circumference of the wound layer. In this way, the saber-like deformation required for the change in direction in the pass wound last can be distributed over an area sufficiently large for safely avoiding permanent distortion of the electric strip.

Furthermore, provision is made that the winding core is fitted with flanges at both ends. Such flanges, which are not required for the inner stability of the large coil, protect the strip material on the face sides of the large coil against damage caused from the outside.

So as to permit very great lengths of the strip, the electric strip of the coil consists of a plurality of strip sections, which are joined by processible welding seams produced by the microplasma welding method or the laser welding process.

An exemplified embodiment of the invention is explained in greater detail in the following with the help of the drawing, in which.

Figure 1:
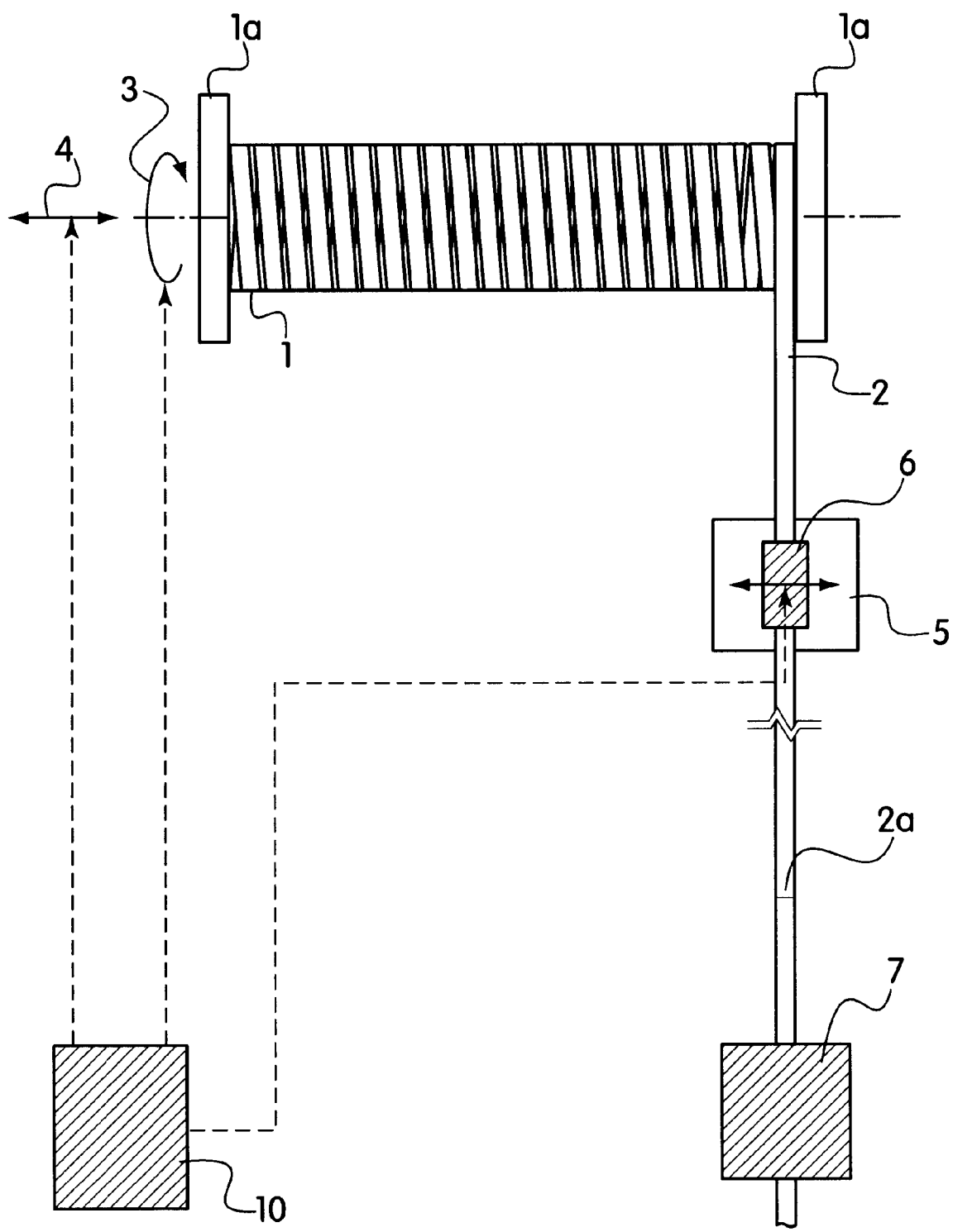
FIG. 1 shows a coil (schematic view) as defined by the invention, with the associated winding device.

In FIG. 1, a winding core is denoted by reference numeral 1. An electric strip 2 is wound on said winding core 1. Winding core 1 is many times wider than electric strip 2. Electric strip 2 is wound across the width of winding core 1 with a reciprocating motion in close successive layer on winding core 1 in such a way that it is exclusively subjected across its entire length to tensile and bending stresses within the elastic range. This means, in other words, that the bending radii are sufficiently large everywhere, and the lateral angles of deflection are nowhere sufficiently large for resulting in permanent distortion in the wound electric strip 2. Furthermore, the strip tension applied in the course of winding is so low that no tensile stresses that could lead to permanent distortion ensue anywhere across the length of the wound electric strip. Due to such reciprocating winding, such a coil of electric strip material can be readily produced in the form of a large coil, on which up to 20 times more electric strip 2 can be wound as compared to conventional disk-like coils. In order to obtain very long sections of strip material, electric strip 2 wound into a large coil consists of a plurality of strip segments, which are joined with each other by welding joints 2a. Welding joints 2a are carefully produced by the microplasma welding or the laser welding process, by which the texture of the material within the proximity of welding joints 2a is not impaired at all, or impaired only in such minor ways that electric strip 2 remains processible also within the area of welding joint 2a.

Winding core 1 is fitted on the sides at both ends with flange disks 1a, which protect the reciprocatingly wound strip 2 against damage from both sides.

For winding electric strip 2 on winding core 1, the latter is rotatingly driven in the direction of arrow 3 by a rotary drive not shown in detail. While rotating, the winding core may reciprocate in the axial direction under computer control. Such reciprocating movement is symbolized by double arrow 4.

Figure 2:
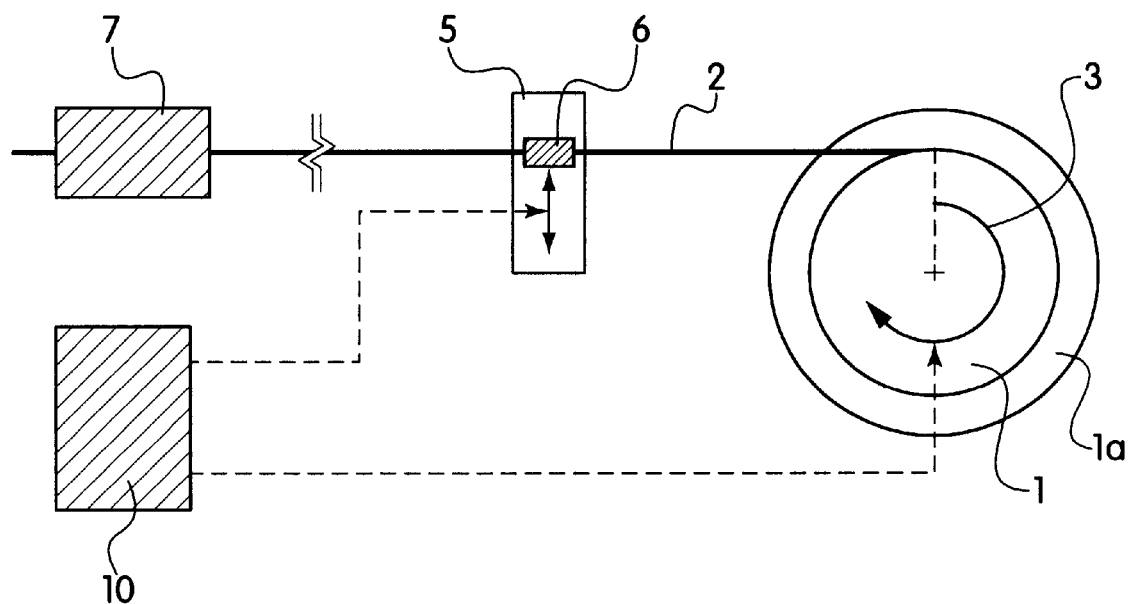
FIG. 2 shows a side view pertaining to FIG. 1.

Electric strip 2 to be coiled is guided with sufficient spacing from winding core 1 in a horizontal strip feeding device 5 with no reversal, if possible. Said strip feeding device 5 has a displaceable strip guide head 6 reciprocating in the horizontal direction; the horizontal movements of said guide head are symbolized in FIG. 1 by a double arrow. Said reciprocating movement is computer-controlled as well and synchronized with the reciprocating movement of winding core 1 in such a way that the lateral angles of deflection occurring in the course of winding of electric strip 2 never exceed a defined critical angle at which the electric strip would be permanently bent sideways. FIG. 2 shows, furthermore, that strip guide head 6 is vertically adjustable as well, Such vertical adjustment possibility is symbolized in FIG. 2 by a double arrow as well. Said vertical adjustment makes it possible for strip guide head 6 to follow the growing diameter of the coil in such a way that the spacing between strip head 6 and the run-up point of the strip on the coil always remains the same.

An exactly operating strip tension controller 7 is arranged with adequate spacing upstream of horizontal strip feeding device 5. Said controller may be designed, for example in the form of a braking frame which, if possible, operates without reversal or only slight deflection of the strip. Said strip tension controller 7 too is computer-controlled and coordinated with the rotary speed of winding core 1 and the reciprocating movements of winding core 1 and of horizontal strip feeding device 5. This permits increasing or reducing the tension of the strip always when horizontal strip feeding device 5 requires this in view of the winding process.

It is possible in this way to exactly control the winding process of electric strip 2 online in such a way that the conditions discussed above with respect to electric strip 2 wound on winding core 1 into a coil are maintained. All movements are controlled by a laying computer 10.

Figure 3:
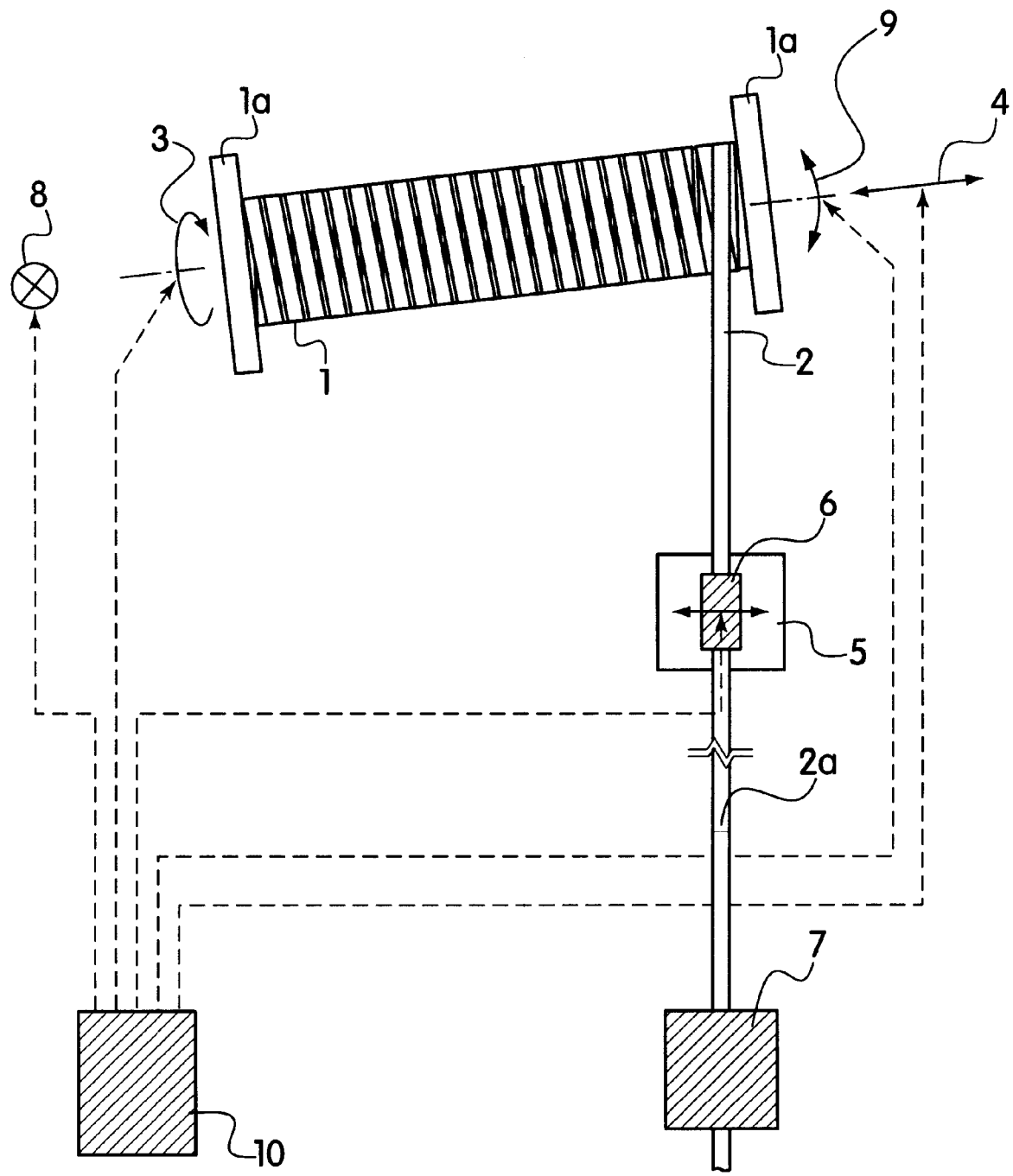
FIG. 3 is a schematic representation similar to FIG. 1 of another embodiment of the winding device.

If need be, winding core 1 may be additionally mounted in such a way that it is capable of swinging around a vertical axis 8(cf FIG. 3) so as to permit a transition between the electric strip 2 running up and the strip section wound last on the coil that is completely straight-lined in the vertical projection. The swinging movements about axis 8 are computer-controlled as well, as indicated by double arrow 9.

Finally, FIG. 1 shows that the two adjacent passes of each wound layer of the coil have a greater axial spacing from each other at the ends of the coil than the axial spacings between adjacent passes within the longitudinal expanse of the coil. Such greater spacings are produced by accelerating for a short time the axial relative speed between winding core 1 and strip feeding device 5 at least during the last rotation of the winding core before the direction is reversed at the axial end of the large coil. This causes such adjacent passes of the wound layers to be axially pulled apart and creates adequate space in the axial direction for permitting across the circumference of the coil elastic saber-like deformation of electric strip 2 without causing crowding or distortion, such elastic deformation effecting the change in direction. In particular, the range of such change in direction can be distributed in this way over a large circumferential area without being obstructed by the preceding pass of electric strip 2.

I claim:

1. A device for computer-controlled winding for coiling an electric strip free of distortion onto a coil, comprising:

a rotatingly driven winding core with an axis; and a strip feeding device having a strip guide head arranged spaced from the winding core and being displaceable parallel with the axis of the winding core, such that the strip guide head and winding core are relatively displaceable against each other horizontally parallel with the axis of the winding core, and wherein the winding device is programmed to coordinate the rotary speed of the winding core and the axial relative speed between the winding core and the strip feed to wind the electric strip in an oscillating motion with successively wound layers, and to reverse the direction of the axial relative movement between the winding core and the strip feed when ends of the coil are reached, and to accelerate relative speed between the winding core and the strip feed during a winding rotation immediately prior to reversing direction.

2. The device according to claim 1, wherein both the winding core and the strip guide head of the strip feeding device are horizontally displaceable parallel with the axis of the winding core.

3. The device according to claim 1, wherein the strip guide head of the strip feeding device is vertically displaceable.

4. The device according to claim 1, wherein the winding core is pivotally mounted and swings around a vertically extending axis.

* * * * *